United States Patent
Patten et al.

[11] 3,764,217
[45] Oct. 9, 1973

[54] PULSED COHERENCE LENGTH MEASUREMENT DEVICE

[75] Inventors: Raymond A. Patten, Oxon Hill, Md.; Jerry A. Blodgett, Annandale, Va.

[73] Assignee: The United States of America as represented by the Secretary of the Navy

[22] Filed: June 16, 1972

[21] Appl. No.: 263,487

[52] U.S. Cl. .................. 356/106, 356/111, 356/113
[51] Int. Cl. ............................................. G01b 9/02
[58] Field of Search ............................. 356/106–113

[56] References Cited
UNITED STATES PATENTS
3,641,343  2/1972  Langer ........................... 356/113 X OTHER PUBLICATIONS
"Recording Parameters...Coherent Wavefronts", 6A0851, Friesem et al.

*Primary Examiner*—David Schonberg
*Assistant Examiner*—Conrad Clark
*Attorney*—R. S. Sciascia et al.

[57] ABSTRACT

A method for measuring the coherence length of laser light using only a single laser pulse. The light from a single laser pulse is divided into two beams which are then projected at the same angle $\theta$ (measured from the normal) onto the same areas on a photographic film to form interference fringes. The film is then developed, placed on a translating platform and passed through the beam of a CW laser, a portion of the beam being diffracted by the interference fringes recorded on the film. The distance, W, between points on the same interference region which are one-quarter of the highest intensity in that region, is measured and the coherence length is calculated from the formula $L = w/2 \sin \theta$.

4 Claims, 4 Drawing Figures

PULSED COHERENCE LENGTH MEASUREMENT DEVICE

STATEMENT OF GOVERNMENT INTEREST

The invention described herein may be manufactured and used by or for the Government of the United States of America for governmental purposes without the patment of any royalties thereon or therefor.

BACKGROUND OF THE INVENTION

This invention relates to optical measurements and especially to the measurement of the coherence length of laser light using only a single laser pulse.

The measurement of the coherence length of a laser is useful for various purposes. It indicates how narrow the bandwidth of the light is, i.e., how close the light produced by the laser is to single-frequency light. This information is useful, for example, in holography, since a certain minimum coherence length is necessary for holographic imaging.

There is a pulse technique now available to obtain coherence length measurements. However, it requires the use of many pulses. There is also a technique which can be used only with continuous- wave (CW) laser light.

BRIEF SUMMARY OF THE INVENTION

The objects and advantages of the invention are acomplished by using a single laser pulse which is separated into two beams. The two beams are later overlapped to form a holographic-type image of interference fringes on a photographic film. The developed film exhibits interference-fringe regions when exposed to CW laser light. In any such region, the distance W, between the quarter-intensity points is measured and the coherence length, L, is founded from the formula:

$$L = W/2 \sin \theta$$

An object of this invention is to measure the coherence length of laser light by means of a single laser pulse.

Other objects, advantages and novel features of the invention will become apparent from the followed detailed description of the invention when considered in conjunction with the accompanying drawings wherein:

DETAILED DESCRIPTION

Figure 1:
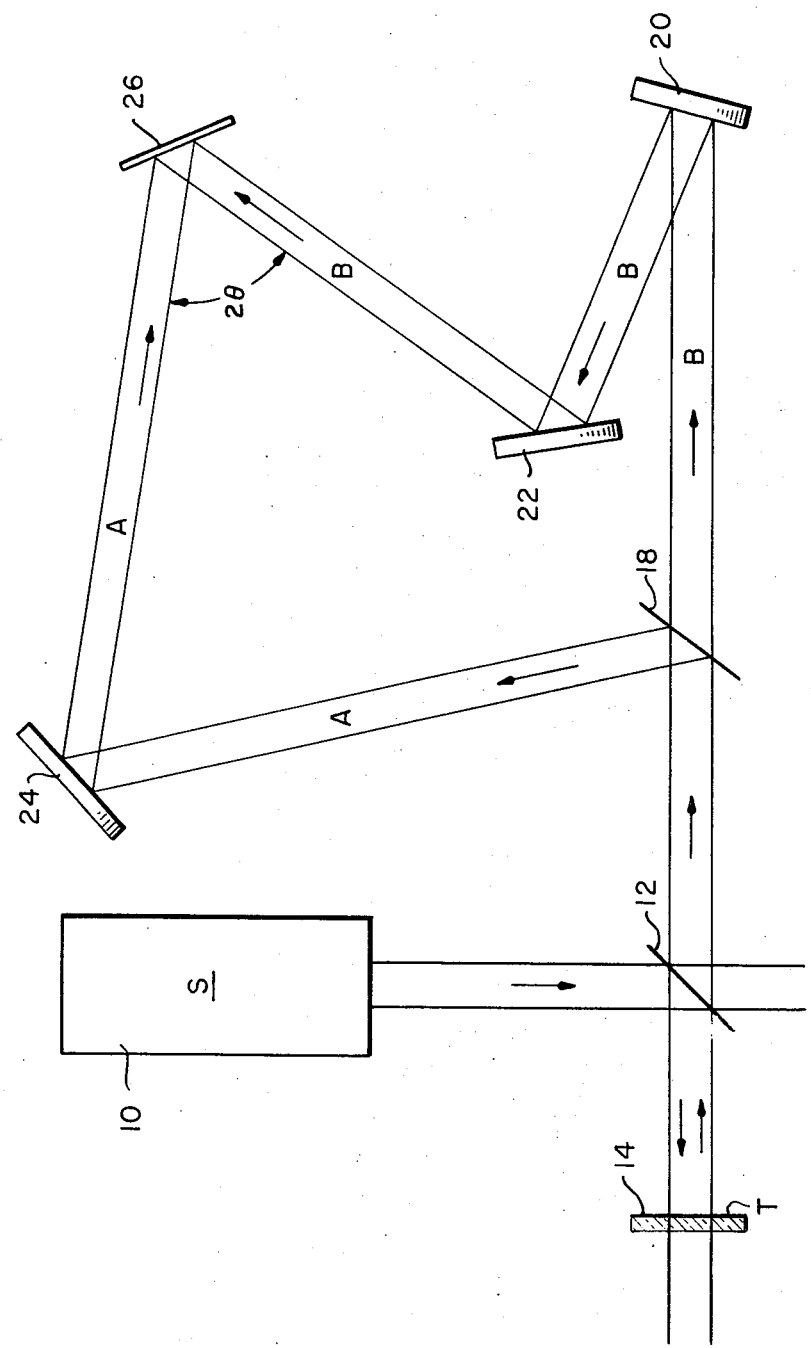
FIG. 1 is a schematic illustration of an embodiment of the recording portion of the invention.

An embodiment of the recording portion of the invention is shown in FIG. 1. A pulsed laser light source 10, for example, a pulsed ruby laser, projects its light onto a beam splitter 12, which reflects part of the light toward the test surface, T(14). This surface must be a light-reflecting surface.

Part of the light that is reflected from the surface T is reflected from beam splitter 18, forming beam A (the arrows show direction of travel of the light) and part passes through the beam splitter 18 to form beam B. These beams are then reflected from the mirrors (20, 22, 24) so that the two beams are projected onto the same area of a photographic film 26 at the same angle, $\theta$, to the normal to the film. The two path lengths A and B (from beam splitter 18 to the film 26) must be equal. It does not matter how many beam reflections take place if these conditions (angle and path length) are met and if the left-right orientations of the beam are preserved.

Figure 2:
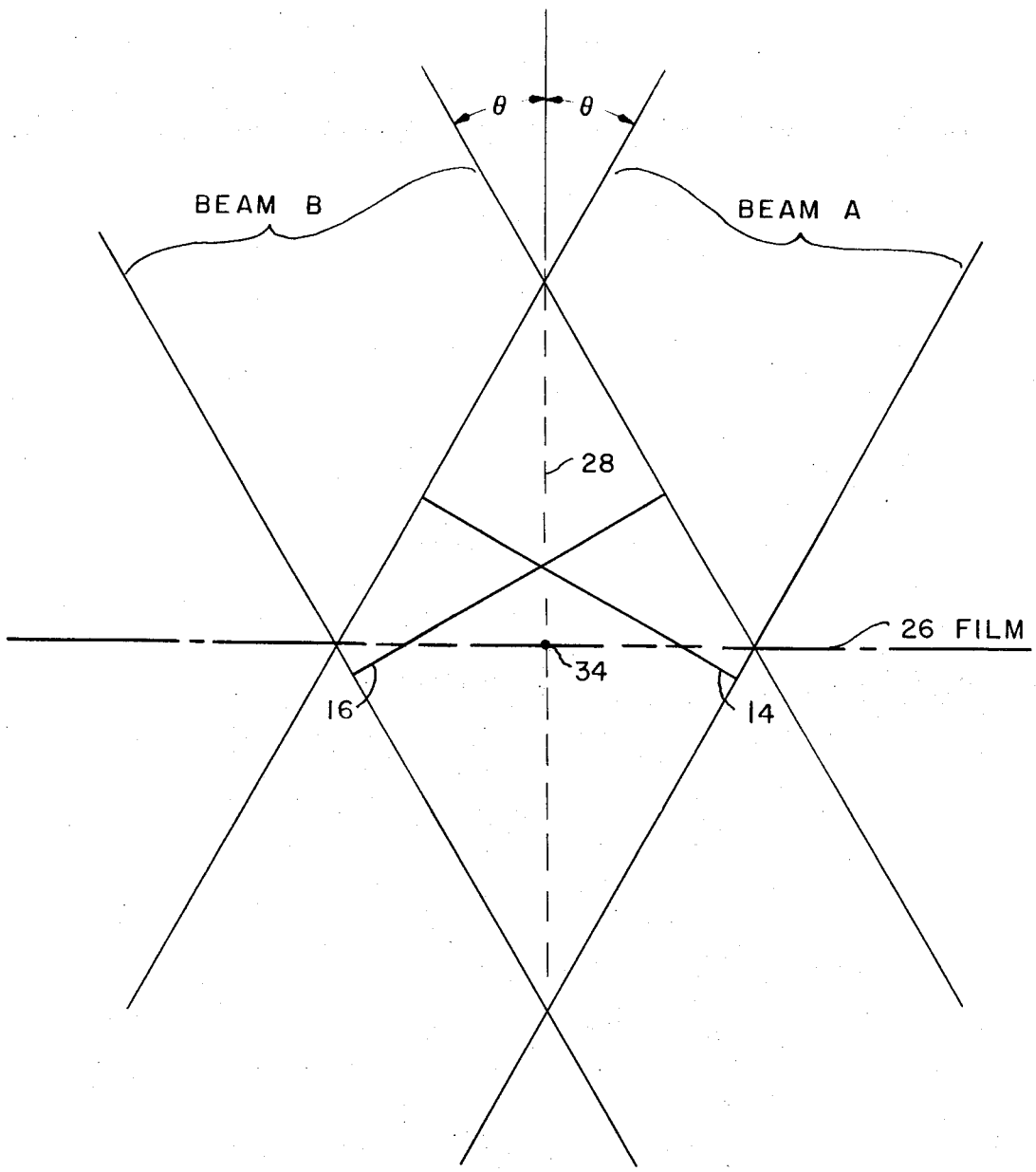
FIG. 2 is a schematic illustration of the wave relations between light beams A and B as they approach the film.

After passing through the beam splitters and being reflected by the mirrors, the wave fronts in each beam intersect near the film 26 in the manner shown in FIG. 2. The beams A and B come in at an angle, $\theta$, to the normal 28 to the film 26.

The normal 28 to the film 26 is a line of intersection of the wavefronts of the two beams, A and B. The point 34, at which the line of intersection makes contact with the film 26 is the point of highest visibility of the interference fringes which are formed by the two light beams. In the figure, lines 14 and 16 are wavefronts of reflections from the surface T.

Figure 3:
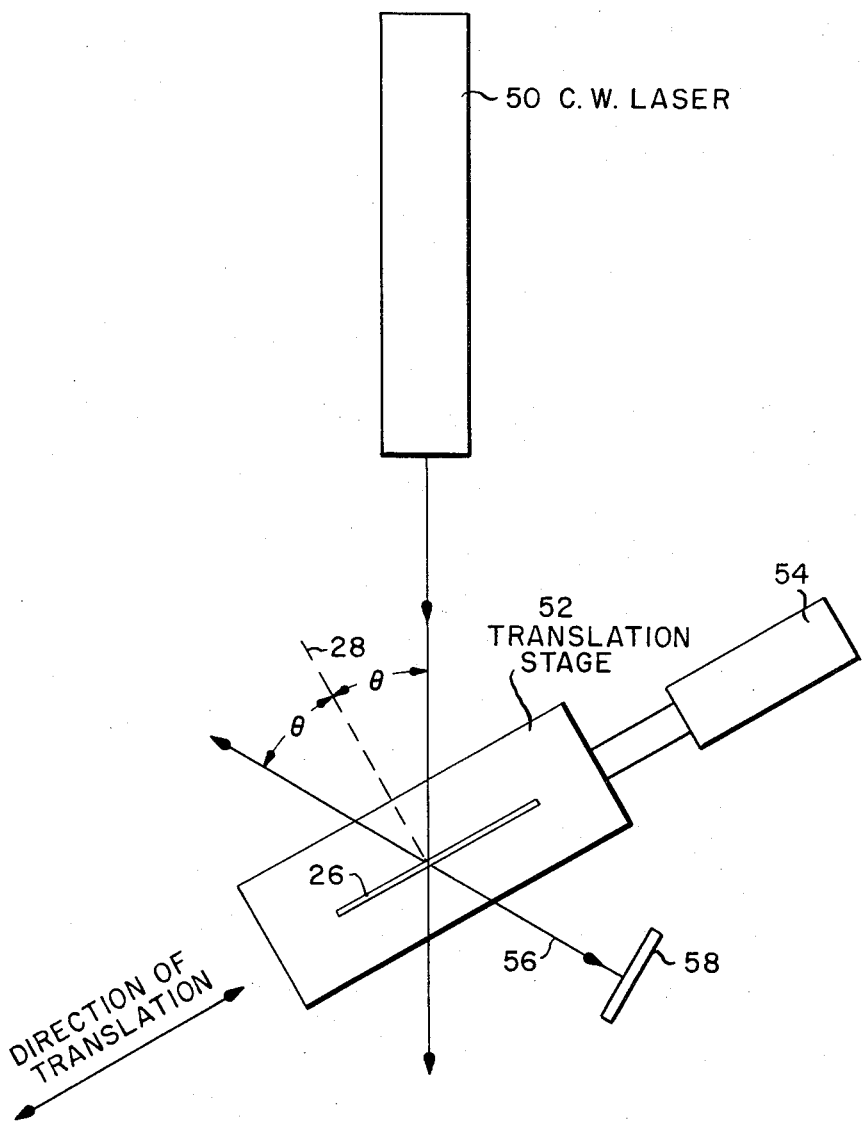
FIG. 3 is a schematic illustration of an embodiment of the interference-fringe measuring portion of the invention.

The interference fringes are recorded on the film although the film is simply a uniform gray color when developed. To obtain the information recorded on the film, the apparatus shown in FIG. 3 is used. The film 26 is moved to the left or to the right and the distance, W, between the points on a single interference region where the light intensity is one-quarter the maximum light intensity is measured. These are the points where the visibility (visibility is proportional to the square of the intensity) is reduced to one-half its peak value. The coherence length, L, is then calculated from the formula:

$$L = W/2 \sin \theta$$

The output of the light detector can be recorded on a strip chart recorder which records the light intensity vs. time. The output graph looks like a single hill. This hill corresponds to the interference-fringe region. To find W, the quarter-intensity points on the hill can be determined and the distance between them measured in terms of time. The actual distance, W, is then obtained by multiplying the value of W in terms of time by the rate of travel of the recording paper.

Figure 4:
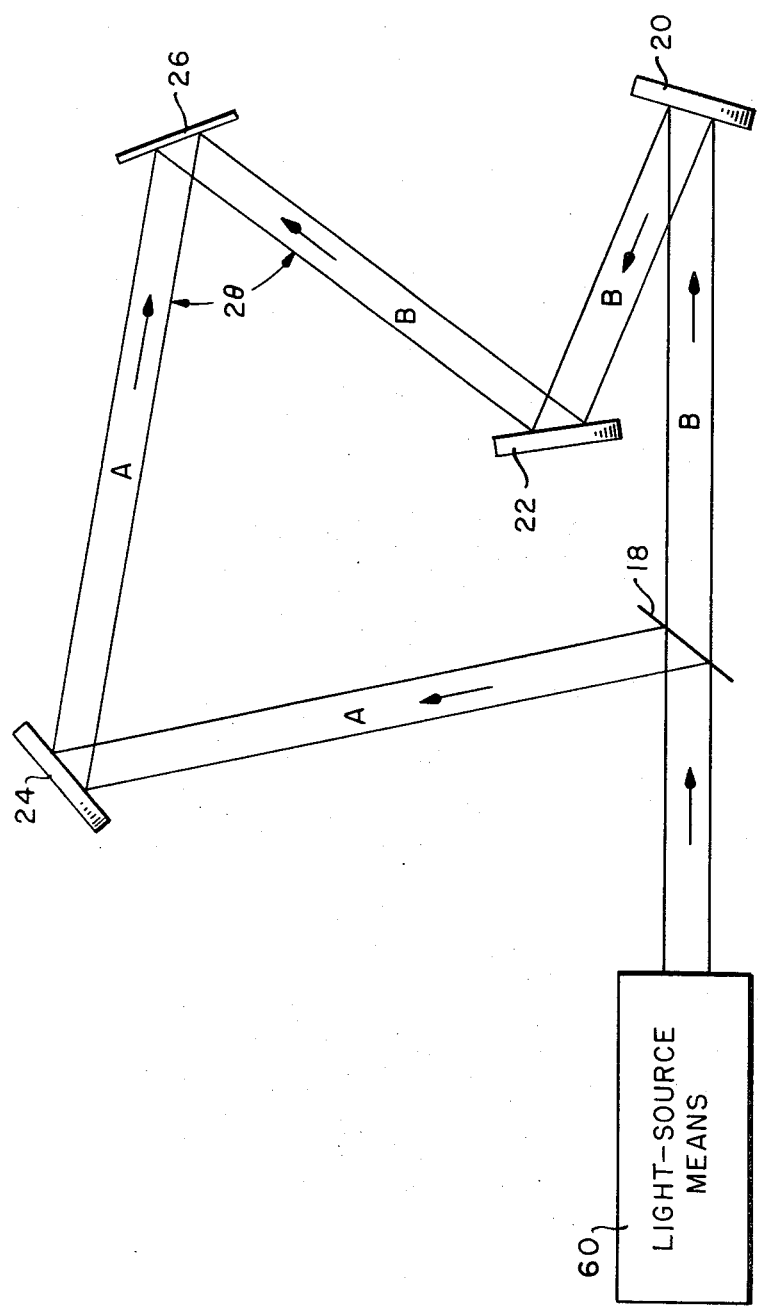
FIG. 4 is a schematic illustration of a second embodiment of the invention.

FIG. 4 shows a second embodiment of the invention and is the preferred one since it is somewhat simpler in that the reflecting surface 14 is eliminated. One other difference lies in the light-source means 60. This is the same laser light source as that designated by the numeral 10 in FIG. 1 but, since the light beam from a laser is not usually sufficiently broad to span the film, a light-beam expander is included. This may be a simple arrangement of negative and positive lenses. Since expanding a light beam by a lens arrangement is well within the state of the art, the arrangement is not specifically shown in the drawing.

Again the image on the film 26 consists of a single interference fringe, or a single hill, on the recording chart. The determination of W is the same as before.

Obviously many modifications and variations of the present invention are possible in light of the above teachings, It is therefore to be understood that within the scope of the appended claims the invention may be practiced otherwise than as specifically described.

What is claimed and desired to be secured by Letters Patent of the United States is:

1. A method for measuring the coherence length of laser light by the use of a single laser pulse comprising the steps of:

projecting said single laser pulse on a light-reflecting surface in a direction normal to said surface;

separating the reflected light into two beams;

projecting said beams upon the same area of a photographic film, the angles of incidence, $\theta$, of each beam with the normal to the film being equal and known;

developing said film;

irradiating said developed film with CW laser light;

using a light detector to indicate the intensity of the light which is diffracted by the film;

measuring the distance between the points on the interference-fringe region where the light intensity is one-quarter of the maximum light intensity of the region; and solving the formula $L = W/2 \sin \theta$ to find the coherence length $L$, $W$ being the distance between points on the same interference region which are one-quarter of the highest intensity in that region.

2. A method as in claim 1, wherein said measurement of the distance between the quarter-intensity points is accomplished by moving said film through said CW laser light so that the angle, $\theta$, made by the normal to the film and the direction of the Cw laser light remains constant.

3. A method for measuring the coherence length of laser light by the use of a single laser pulse comprising the steps of:

generating a single laser pulse;

separating said pulse into two beams;

projecting said beams upon the same area of a photographic film, the angles of incidence, $\theta$, of each beam with the normal to the film being equal and known;

developing said film;

irradiating said developed film with CW laser light;

using a light detector to indicate the intensity of the light which is diffracted by the film;

measuring the distance between the points on the interference-fringe region where the light intensity is one-quarter of the maximum light intensity of the region; and solving the formula $L = W/2 \sin \theta$ to find the coherence length L.

4. A method as in claim 3, wherein said measurement of the distance between the quarter-intensity points is accomplished by moving said film through said CW laser light so that the angle, $\theta$, made by the normal to the film and the direction of the CW laser light remains constant.

* * * * *